(12) United States Patent
Tanaka

(10) Patent No.: US 9,013,654 B2
(45) Date of Patent: Apr. 21, 2015

(54) PLANAR LIGHTING DEVICE, ELECTRONIC DEVICE PROVIDED THEREWITH, AND LIQUID-CRYSTAL DISPLAY DEVICE

(75) Inventor: Shigenori Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 114 days.

(21) Appl. No.: 13/981,129

(22) PCT Filed: Jan. 23, 2012

(86) PCT No.: PCT/JP2012/051315
§ 371 (c)(1),
(2), (4) Date: Jul. 23, 2013

(87) PCT Pub. No.: WO2012/102227
PCT Pub. Date: Aug. 2, 2012

(65) Prior Publication Data
US 2013/0300982 A1    Nov. 14, 2013

(30) Foreign Application Priority Data
Jan. 28, 2011  (JP) ................................. 2011-016521

(51) Int. Cl.
*G02F 1/1335* (2006.01)
*F21V 8/00* (2006.01)

(52) U.S. Cl.
CPC ............ *G02B 6/0061* (2013.01); *G02B 6/0046* (2013.01); *G02B 6/0078* (2013.01)

(58) Field of Classification Search
CPC .. G02B 6/0068; G02B 6/0078; G02B 6/0028; G02B 6/0046; G02B 6/0076; G02B 6/0011; G02B 6/0066; G02B 6/0075; G02B 6/0091; G02B 6/24; G02B 6/0035; G02F 1/133615; G02F 2/133603

USPC .............. 362/616, 97.1, 612, 613, 97.2, 615, 362/628, 608, 606, 617, 249.02, 607, 625, 362/23.09, 555, 600; 349/65, 61, 56; 385/129, 901, 39
See application file for complete search history.

(56) References Cited

U.S. PATENT DOCUMENTS

| | | | |
|---|---|---|---|
| 7,883,254 B2 * | 2/2011 | Kinoshita et al. ............ | 362/615 |
| 2008/0030650 A1 | 2/2008 | Kitagawa et al. | |

FOREIGN PATENT DOCUMENTS

JP        2008-34372 A      2/2008

*Primary Examiner* — Thoi Duong
(74) *Attorney, Agent, or Firm* — Chen Yoshimura LLP

(57) ABSTRACT

A light guide plate (2) in the planar illumination device (1) in one example of the present invention has: first connecting surfaces (21) that respectively connect adjacent light-output surfaces; and second connecting surfaces (11) that respectively connect adjacent opposite surfaces. The light guide plate satisfies one of the following conditions: (condition "i") the opposite surface (10b) of light guide section (2B) is higher in the light-output direction than the light-output surface (20c) of the light guide section (2C); (condition "ii") the opposite surface of light guide section is at the same height in the light-output direction as the light-output surface of an adjacent light guide section; or (condition "iii") the opposite surface of the light guide section is lower in the light-output direction than the light-output surface of the adjacent light guide section and the height difference in the light-output direction between the aforementioned opposite surface and the aforementioned light-output surface is at most 35% of the height difference between the light-output surface and opposite surface of each light guide section.

14 Claims, 8 Drawing Sheets

PLANAR LIGHTING DEVICE, ELECTRONIC DEVICE PROVIDED THEREWITH, AND LIQUID-CRYSTAL DISPLAY DEVICE

TECHNICAL FIELD

The present invention relates to a planar illumination device that outputs light from a light source in a planar manner using a light guide plate, and to an electronic device such as a liquid crystal display device, for example, provided therewith.

BACKGROUND ART

In the field of liquid crystal display devices, a backlight including a side edge-type (also referred to as side light type) light guide plate that outputs light from the light source in a planar manner using a light guide plate is often used in order to obtain a thinner device. In addition, a technique is known in which area control is conducted by separating a light guide plate into a plurality of regions with a light source provided for each separated region, and emitting light only from a separated region (light-emitting region) corresponding to a desired light source by turning on this light source. Through such area control, it is possible to improve display quality by attaining pseudo-impulse-type display or adjusting the brightness of specific areas of the backlight while controlling the light transmittance of the liquid crystal layer in the liquid crystal display element.

Patent Document 1 discloses an illumination device in which area control of the light guide plate is attained, for example. FIG. 16 is a plan view of the illumination device of Patent Document 1. FIG. 17 is a cross-sectional view along the line A-A' of FIG. 16, viewed in the direction of the arrows. An illumination device 101 in FIGS. 16 and 17 is provided with a light guide plate 102 constituted of a plurality of blocks 102a aligned in a row, and a plurality of light sources 103, which are each provided for each block 102a, and which emit light to the blocks 102a. In at least some of the regions between adjacent blocks 102a, a gap of at least 0.1 microns, which is an air layer 105, is formed, which optically separates the blocks from each other. Also, at least one of the upper surface and the lower surface of the light guide plate 102 has formed thereon a prism or a pattern (not shown in drawings) to diffuse light.

If light is emitted from one light source 103 in the illumination device 101 of FIGS. 16 and 17, then this light enters one block 102a from an edge face of the light guide plate 102, and the light undergoes total reflection from surfaces of the block 102a (in other words, faces 102b that are side faces of the light guide plate 102 or boundaries between the blocks 102a and the air layers 105, and the upper surface and the lower surface of the block 102a), and is transmitted through the block 102a in a direction away from the light source 103. In FIG. 16, a light path L is shown as an example of the transmission path of this light. During transmission, light that is scattered by the prism or pattern formed on the upper surface and/or the lower surface of the block light 102a, and thus, no longer satisfies the total reflection condition, is outputted towards the outside of the block 102a from the upper surface or the lower surface. Light is evenly outputted from the light guide plate 102 by providing the prism or pattern on the block 102a with an increased density in positions further downstream along the direction that the light travels. As a result, planar light is emitted from the light guide plate 102. Thus, when emitting light from one block, other blocks adjacent thereto do not emit light, which allows pseudo-impulse display to be attained.

Patent Document 1 also discloses a light guide plate shown in FIG. 18. FIG. 18 is a configuration corresponding to that of FIG. 17. In FIG. 18, wedge-shaped grooves 284c are formed in a light guide plate 282c, and the grooves 284c separate the light guide plate 282c into a plurality of blocks 282d. Thus, the shape of the blocks 282d in a cross-section that intersects perpendicularly with the lengthwise direction of the blocks 282d is trapezoidal. The taper angle of the block 282d, or in other words, the angle of the side face of each groove 284c with respect to a direction perpendicular to the surface of the light guide plate 282c is 5°, for example. Also, the grooves 284c penetrate the light guide plate 282c in the lengthwise direction thereof, but do not penetrate the light guide plate 282c in the thickness direction thereof. As a result, adjacent blocks 282d are optically joined in some portions.

RELATED ART DOCUMENT

Patent Document

Patent Document 1: Japanese Patent Application Laid-Open Publication, "Japanese Patent Application Laid-Open Publication No. 2008-34372 (Published on Feb. 14, 2008)"

SUMMARY OF THE INVENTION

Problems to be Solved by the Invention

However, in the configuration of FIGS. 16 and 17, bright lines form at the edges of the blocks 102a (edges on the side faces of the blocks 102a), which is a cause for deterioration in display quality.

Specifically, in the configuration of FIGS. 16 and 17, it is assumed that, of two adjacent blocks 102a, the light source for one of the blocks 102a is turned on, and the light source for the other block 102a is turned off. Some of the light traveling through the block 102a in which the light source is turned on is repeatedly reflected and transmitted at the boundary between the block 102a and the air layers 105. The reflected light continues traveling through the block 102a. On the other hand, light that has been transmitted across the boundary is reflected off of the boundary between a block 102a adjacent to the block 102a from which the light originated and the air layer 105, and re-enters the block 102a from which the light originated. However, if the edge of the block 102a forms a sharp angle as in FIG. 17, then light is concentrated in this area, which is susceptible to being perceived as a bright line. If such a light guide plate is used in the backlight of a display device, this results in a significant deterioration in display quality in the display device.

Mobile devices such as mobile telephones have restrictions in thickness, and therefore, it is necessary that the light diffusion member that can be disposed on the light-emitting side of the light guide plate be a thin sheet layer. Thus, it is not possible to provide sufficient light diffusion properties in the light diffusion member of a mobile device, compared to that of a large display device. Thus, the bright lines that appear in the light guide plate in FIGS. 16 and 17 become a major problem in mobile devices.

Even in the configuration of FIG. 18, the angle of the slits (air layer 105) formed between adjacent blocks 282d is sharp, this shape resulting in the appearance of bright lines.

Means for Solving the Problems

The present invention was made in view of the conventional problem described above, and an object thereof is to provide a planar illumination device having a light guide plate that can attain area control without resulting in the appearance of bright lines, and an electronic device and a liquid crystal display device provided therewith.

That is, in order to solve the above-mentioned problem, a planar illumination device according to the present invention includes:

a light guide plate having a plurality of light guide sections each having a light-output surface provided in an active light-emitting region and an opposite surface opposite to the light-output surface, the respective light-output surfaces of the light guide sections all facing the same direction; and a group of light sources disposed along an edge face of the light guide plate such that one or a plurality of light sources are provided for each of the light guide sections, wherein, in the light guide plate, one of the following is satisfied:

(i) an opposite surface of a first light guide section of the light guide sections is at a height greater than a light-output surface of a second light guide section adjacent to the first light guide section, height being defined with respect to a direction where light is outputted from the light-output surface;

(ii) the opposite surface of the first light guide section and the light-output surface of the second light guide section adjacent thereto are at the same height as each other; or (iii) the opposite surface of the first light guide section is in a position at a height greater than an opposite surface of the second light guide section adjacent to the first light guide section, a light-output surface of the first light guide section is in a position at a height greater than the light-output surface of the second light guide section, the opposite surface of the first light guide section is in a position lower than the light-output surface of the second light guide section, and a difference in height between the opposite surface of the first light guide section and the light-output surface of the second light guide section is at most 35% of a difference in height between the light-output surface and the opposite surface of each one of the light guide sections, wherein the light guide plate has a first connective surface connecting the adjacent light-output surfaces, and a second connective surface connecting the adjacent opposite surfaces, and wherein an angle formed between the light-output surface and the first connective surface in the light guide plate, and an angle formed between the opposite surface and the second connective surface in the light guide plate are obtuse angles.

According to the configuration above, it is possible to provide a planar illumination device having a light guide plate for which area control can be performed without the appearance of bright lines.

The planar illumination device of the present invention has light sources for the respective light guide sections of the light guide plate, and light emitted from the light sources enters a certain light guide section, and is transmitted therein in a direction moving away from the light sources. As known conventionally, some of the transmitted light moves towards a different light guide section adjacent to the certain light guide section in the process of being transmitted, due to the properties of light, and thus, in a conventional light guide body (light guide plate), this light simply entered the adjacent light guide section as is, or caused bright lines to be perceived at side faces thereof due to reflection. As a countermeasure, the planar illumination device of the present invention has the configuration above, and thus, with a difference in height for adjacent light guide sections, using the connective surfaces formed between the light guide sections, unwanted light, or in other words, light that is supposed to be guided to one light guide section but is transmitted towards an adjacent light guide section is repeatedly transmitted through and reflected at the connective surfaces. As a result, it is possible to prevent the unwanted light from entering the adjacent light guide section.

More specifically, two adjacent light guide sections are designated as a first light guide section and a second light guide section. The light-output surfaces of the first light guide section and the second light guide section face the same direction, and the respective opposite surfaces, which are the surfaces opposite to the light-output surfaces, also face the same direction (direction opposite to the light-output direction). Light from the light source for each light guide section is transmitted therein, and is outputted from the light-output surface. In other words, the light-output surface is formed almost perpendicularly to the light-output direction, and the opposite surface opposite to the light-output surface is also formed almost perpendicularly to the light-output direction. That is, the light-output surface of a certain light guide section is at a higher position than the opposite surface in the light-output direction.

In the present invention, in the first light guide section and the second light guide section, the light-output surfaces and the opposite surfaces of the adjacent first light guide section and second light guide section are at different heights in the light-output direction from the light-output surface, and satisfy any one of the conditions (i) to (iii).

First, as in (i), the opposite surface of the first light guide section is at a higher position in the light-output direction than the light-output surface of the second light guide section, or as in (ii), the opposite surface of the first light guide section and the light-output surface of the second light guide section are at the same height in the light-output direction.

In other words, the first light guide section and the second light guide section are formed into steps.

With such a configuration, light transmitted within the first light guide section, for example, does not directly enter the second light guide section, and the light instead enters the area between the connective surfaces disposed at the step section at the boundary between the first light guide section and the second light guide section, and the light is repeatedly reflected off of and transmitted through the connective surfaces.

In the conditions (i) or (ii), the first connective surface connecting the light-output surfaces and the second connective surface connecting the opposite surfaces are opposite to each other, and thus, the light reflected at the first connective surface (unwanted light) is incident on the second connective surface, and is transmitted therethrough or reflected thereat.

In this manner, the light is repeatedly transmitted and reflected between two opposite connective surfaces, and thus, the unwanted light disappears before it reaches the adjacent light guide section, thereby allowing a configuration in which the light does not enter the adjacent light guide section.

Thus, a high degree of area control can be attained with the condition (i) or (ii).

Next, as in (iii) described above, the thickness from the light-output surface to the opposite surface is equal for all light guide sections, and the opposite surface of the first light guide section is at a lower position in the light-output direction from the light-output surface than the light-output surface of the second light guide section adjacent to the first light guide section; however, by satisfying the condition that the difference in height in the light-output direction between the opposite surface of the first light guide section and the light-output surface of the second light guide section is at most 35% of the difference in height between the light-output surface and the opposite surface of one light guide section, unwanted light can be transmitted through or reflected at two connective surfaces that face each other, and can be therefore weakened to a level in which the unwanted light does not enter the adjacent light guide section.

In the planar illumination device of the present invention, the angle between the light-output surface and the first connective surface in the light guide plate, and the angle between the opposite surface and the second connective surface in the light guide plate are obtuse angles, and thus, not as much light gathers at the angular parts compared to a case in which the angles are acute. Thus, bright lines do not appear, and a deterioration in display quality due to the bright lines that occurred in conventional devices does not occur.

By using the configuration above, it is possible to provide a planar illumination device having a light guide plate for which area control can be performed without the appearance of bright lines.

Also, unlike a case in which a plurality of separated blocks are fixed together with a fixing jig or the like to form one light guide body, for example, a light guide plate is provided in the present invention, and thus, there is no need to fix the light guide sections to each other. If individually separate light guide sections are aligned in a row and fixed together, there is a need to make the edge faces uniform in position for all of the light guide sections, and if the light guide sections move out of alignment, the distance between the respective light sources and the edge face becomes different for each light guide section, which means that the amount of light entering the individual light guide sections becomes varied. However, by providing a light guide plate such as that of the present invention, there is no need to conduct a step to make the positions of the edge faces of the light guide sections uniform, and because the distances between the respective light sources and the respective edge faces are equal, the amount of light entering therein can also be made equal.

The present invention also includes an electronic device that includes a planar illumination device having the above-mentioned configuration.

The present invention also includes a liquid crystal display device having: the planar illumination device having the above-mentioned configuration; and a liquid crystal display panel having a liquid crystal layer, the liquid crystal display panel being disposed opposite to the active light-emitting region of the light guide plate.

Effects of the Invention

As stated above, the present invention is a planar illumination device, including: a light guide plate having a plurality of light guide sections each having a light-output surface provided in an active light-emitting region and an opposite surface opposite to the light-output surface, the respective light-output surfaces of the light guide sections all facing the same direction; and a group of light sources disposed along an edge face of the light guide plate such that one or a plurality of light sources are provided for each of the light guide sections, wherein, in the light guide plate, one of the following is satisfied:

(i) an opposite surface of a first light guide section of the light guide sections is at a height greater than a light-output surface of a second light guide section adjacent to the first light guide section, height being defined with respect to a direction where light is outputted from the light-output surface;

(ii) the opposite surface of the first light guide section and the light-output surface of the second light guide section adjacent thereto are at the same height as each other; or (iii) the opposite surface of the first light guide section is in a position at a height greater than an opposite surface of the second light guide section adjacent to the first light guide section, a light-output surface of the first light guide section is in a position at a height greater than the light-output surface of the second light guide section, the opposite surface of the first light guide section is in a position lower than the light-output surface of the second light guide section, and a difference in height between the opposite surface of the first light guide section and the light-output surface of the second light guide section is at most 35% of a difference in height between the light-output surface and the opposite surface of each one of the light guide sections, wherein the light guide plate has a first connective surface connecting the adjacent light-output surfaces, and a second connective surface connecting the adjacent opposite surfaces, and wherein an angle formed between the light-output surface and the first connective surface in the light guide plate, and an angle formed between the opposite surface and the second connective surface in the light guide plate are obtuse angles.

With this configuration, a planar illumination device having a light guide plate that can attain area control without the appearance of bright lines, and an electronic device and a liquid crystal display device provided therewith, can be provided.

DETAILED DESCRIPTION OF EMBODIMENTS

Below, one embodiment of the present invention will be described. In the latter half of the present embodiment, a liquid crystal display device having a planar illumination device as a backlight will be described as an electronic device provided with a planar illumination device of the present invention. In general, liquid crystal display devices have the disadvantage of blurring occurring in an animated image unlike CRT (cathode-ray tube) display devices. In other words, in CRT display devices, there is a non-light-emitting period in which pixels do not emit light between a light-emitting period of pixels in one frame and a light-emitting period of pixels in the following frame, which means residual images do not occur very often. However, the display method used in liquid crystal display devices is of the "hold" type in which there is no non-light-emitting period, causing residual images, which are perceived by the viewer as blurring in the animated image. In a liquid crystal display device having a backlight of the present embodiment, as will be described later, a planar illumination device 1, which is a backlight, is divided, and by sequentially turning off these divided parts in synchronization with a timing in which an image signal is applied to the liquid crystal panel, it is possible to attain backlight blinking, which is a technique in which a black image is inserted between adjacent instances of image display. As a result, pseudo-impulse display is attained, mitigating residual images. A planar illumination device of the present embodiment will first be described below.

<Planar Illumination Device>

Figure 1:
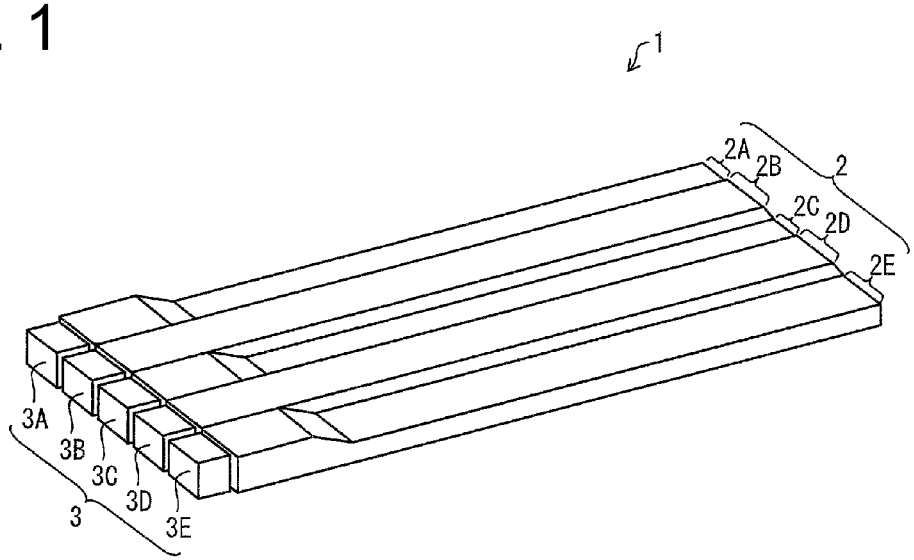
FIG. 1 is a perspective view of a schematic configuration of one embodiment of a planar illumination device according to the present invention.
Figure 2:
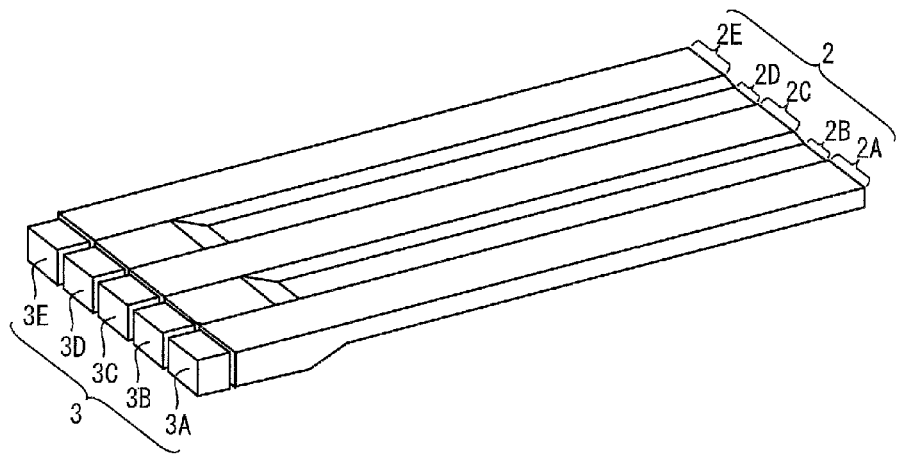
FIG. 2 is a perspective view from a rear side of the planar illumination device shown in FIG. 1.

FIG. 1 is a perspective view of a schematic configuration of one embodiment of a planar illumination device according to the present invention. FIG. 2 is a perspective view from the rear of the planar illumination device shown in FIG. 1.

As shown in FIG. 1, the planar illumination device of the present embodiment includes a light guide plate 2 and a group of light sources 3.

The light guide plate 2 is a light guide member in which light from the light sources is inputted to the edge face (side edge) of the light guide plate, the light is transmitted therethrough, and the light is outputted in a planar manner from a light-output surface formed on one surface side of the light guide plate 2. Such a light guide member is widely known, but the planar illumination device of the present invention has a special configuration in order to perform the backlight blinking described above, which is the so-called area control. This will be described below.

As shown in FIG. 1, the light guide plate 2 has a group of light sources 3 disposed along one side edge thereof, and a plurality of light guide sections extending along a direction moving away from the group of light sources 3 are aligned along the one side edge of the light guide plate 2. The present embodiment shows a light guide plate 2 provided with five light guide sections 2A to 2E as shown in FIG. 1.

As shown in FIG. 1, in the light guide plate 2, one light source is provided per light guide section. Specifically, a light source 3A is provided on one side edge of the light guide section 2A, a light source 3B is provided on one side edge of the light guide section 2B, a light source 3C is provided on one side edge of the light guide section 2C, a light source 3D is provided on one side edge of the light guide section 2D, and a light source 3E is provided on one side edge of the light guide section 2E.

Each light source can be independently controlled so as to be on or off. The basic function of area control is attained by having a configuration in which light is only outputted from a light guide section that faces a light source that is on, and in which light is not outputted from a light guide section that faces a light source that is off.

Figure 3:
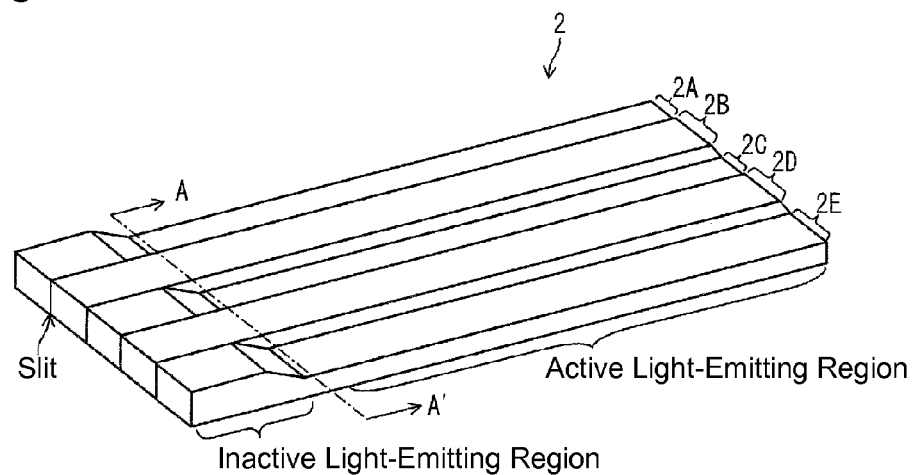
FIG. 3 is a perspective view that shows a light guide plate provided in the planar illumination device shown in FIG. 1.

FIG. 3 is a perspective view showing only the light guide plate 2 of FIG. 1. The light guide plate 2 is provided with an active light-emitting region and an inactive light-emitting region, and the light-output surfaces of the light guide sections are located in the active light-emitting region, and light is outputted from the light-output surfaces. Thus, the liquid crystal display device to be mentioned below has a display panel disposed opposite to the active light-emitting region.

On the other hand, the inactive light-emitting region is not provided with a light-output surface, and the group of light sources 3 is provided on a side face provided in the inactive light-emitting region.

The inactive light-emitting region of the light guide plate 2 is provided with slits 23 at the boundaries between adjacent light guide sections, the slits 23 extending from the inactive light-emitting region where it meets the active light-emitting region, to the edge face where the group of light sources 3 is provided. The slits 23 extend from the front surface of the light guide plate 2 shown in FIG. 1 to the rear surface of the light guide plate 2 shown in FIG. 2, and also penetrate the edge face where the group of light sources 3 is provided. In other words, the edge face is divided into five areas by the slits 23. One area corresponds to one light guide section.

By providing the slits, the inactive light-emitting regions can be optically separated, which means that light emitted from a light source disposed adjacent to each edge face of the inactive light-emitting region divided by the slits is not transmitted through light guide sections that do not correspond to this light source, which allows excellent area control to be conducted.

As described above, the group of light sources 3 includes five light sources 3A to 3E, and one light source is provided per light guide section. It is preferable that the light-output region of the light source be within one area, and in particular, it is necessary that the light source be of a size such that light therefrom does not reach adjacent areas. The five light sources 3A to 3E can be LEDs (light-emitting diodes), for example.

In addition to the light sources 3A to 3E, the group of light sources 3 may be provided with an LED substrate electrically connected to the light sources. When using such a configuration, the five light sources 3A to 3E may be mounted on one LED substrate, or one or more of the five light sources 3A to 3E may be mounted on one LED substrate.

Figure 4:
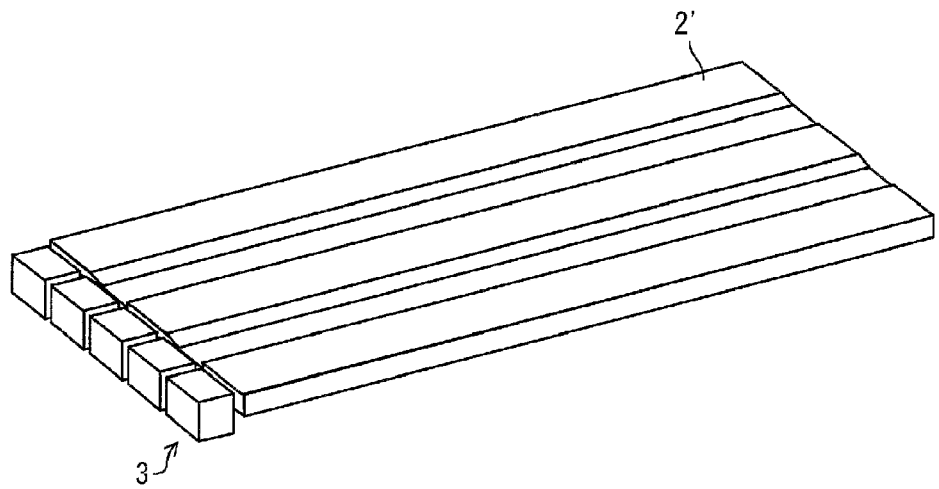
FIG. 4 is a perspective view that shows a modification example of a light guide plate provided in the planar illumination device shown in FIG. 1.

The inactive light-emitting region does not necessarily need to be provided, and a configuration may be used in which the entire light guide plate 2' is an active light-emitting region as shown in FIG. 4, for example, and the group of light sources 3 is provided along the edge face of the active light-emitting region.

The five light guide sections 2A to 2E of the light guide plate 2 are not structurally independent of each other and have an integral structure. Thus, it is possible to form the light guide plate 2 integrally using a die.

A characteristic of the present invention is that the five light guide sections are optically separated from each other despite being structurally integral. Here, "optically separated from each other" refers to the fact that it is possible for light to be outputted only from a light guide section for a light source that is on, and for the light that is transmitted through the light guide section to not also be outputted from a light guide section for a light source that is off.

In other words, the light guide plate of the planar illumination device of the present invention has an active light-emitting region with a special structure to separate the light guide sections optically. This will be described in detail below.

Figure 5:
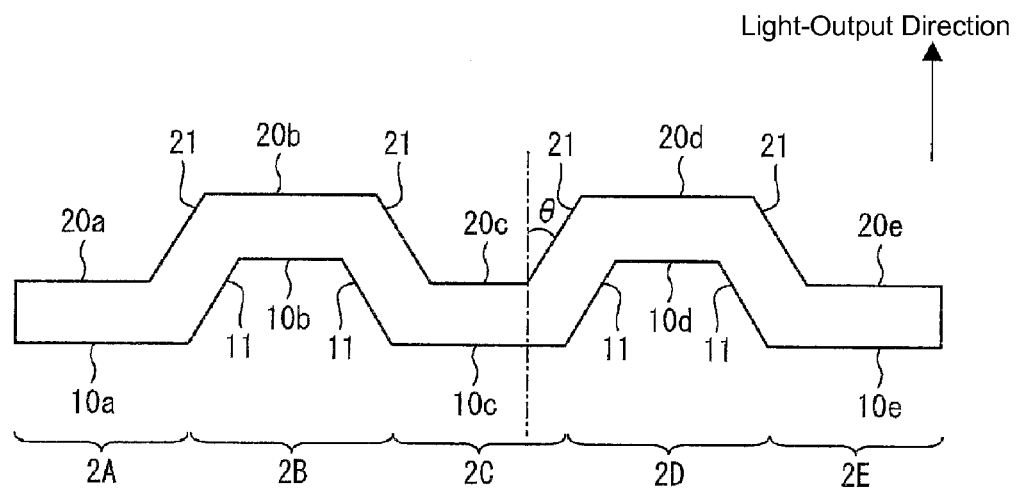
FIG. 5 is a cross-sectional view of a light guide plate along the line A-A' shown in FIG. 3, viewed in the direction of the arrows.

FIG. 5 is a cross-sectional view of the light guide plate 2 along the line A-A' shown in FIG. 3, viewed in the direction of the arrows.

As shown in FIG. 5, the light guide plate 2 has five light guide sections 2A to 2E aligned overall in the left and right direction of the page. Each of the five light guide sections 2A to 2E has a light-output surface provided in the active light-emitting region, and an opposite surface that is on a side opposite to the light-output surface.

Specifically, the light guide section 2A includes a light-output surface 20a and an opposite surface 10a on the opposite side thereof. The light guide section 2B includes a light-output surface 20b and an opposite surface 10b on the opposite side thereof. The light guide section 2C includes a light-output surface 20c and an opposite surface 10c on the opposite side thereof. The light guide section 2D includes a light-output surface 20d and an opposite surface 10d on the opposite side thereof. The light guide section 2E includes a light-output surface 20e and an opposite surface 10e on the opposite side thereof.

The five light guide sections 2A to 2E have the light-output surfaces 20a to 20e aligned in one direction. In other words, light is outputted from the respective light-output surfaces 20a to 20e in the light-output direction shown in FIG. 5, overall.

Thus, the alignment direction of the five light guide sections 2A to 2E is almost perpendicular to the light-output direction, and the light-output surfaces 20a to 20e are surfaces that spread in two dimensions that are perpendicular to the light-output direction.

The lengths between the light-output surfaces and the opposite surfaces of the respective five light guide sections 2A to 2E, or in other words the thicknesses of the respective light guide sections are equal to each other.

As a characteristic structure, two adjacent light guide sections of the light guide plate 2 satisfy condition "i," and first connective surfaces 21 that connect together adjacent light-output surfaces 20a to 20e, and second connective surfaces 11 that connect together adjacent opposite surfaces 10a to 10e are included. The light guide section 2B and the light guide section 2C shown in FIG. 5 will be described below as examples of two adjacent light guide sections.

Condition "i" is that:
<Condition "i">
of adjacent light guide sections, the opposite surface 10b of one light guide section 2B (first light guide section) is at a higher position in the light-output direction than the light-output surface 20c of the other light guide section 2C (second light guide section).

In other words, according to condition "i", of adjacent light guide sections, the light-output surface 20c of the light guide section 2C (second light guide section) is at a lower position in the light-output direction than the opposite surface 10b of the other light guide section 2B (first light guide section).

In the light guide plate 2, the adjacent light guide section 2A (second light guide section) and light guide section 2B (first light guide section) satisfy the condition "i," the adjacent light guide section 2B (first light guide section) and light guide section 2C (second light guide section) satisfy the condition "i," the adjacent light guide section 2C (second light guide section) and light guide section 2D (first light guide section) satisfy the condition "i," and the adjacent light guide section 2D (first light guide section) and light guide section 2E (second light guide section) satisfy the condition "i."

In other words, as shown in FIG. 5, the light guide section 2A, the light guide section 2B, the light guide section 2C, the light guide section 2D, and the light guide section 2E are provided as steps in this order such that the heights thereof in the light-output direction are low, high, low, high, and low.

The "height in the light-output direction" represents the position along the direction extending from the opposite surface to the light-output surface of a certain light guide section, and it can be said that the height along the light-output direction of this light-output surface is greater than a height of the opposite surface along the light-output direction.

In the present embodiment, the light-output surface 20a of the light guide section 2A, the light-output surface 20c of the light guide section 2C, and the light-output surface 20e of the light guide section 2E are at the same height (lower position) in the light-output direction, and the light-output surface 20b of the light guide section 2B and the light-output surface 20d of the light guide section 2D are at the same height (higher position). In other words, the surface of the light guide plate 2 of the present embodiment can also be said to have two different levels.

The first connective surfaces 21 and the second connective surfaces 11 between adjacent light guide sections that satisfy the condition "i" simply need to be smooth inclined surfaces inclined with respect to the light-output surfaces and the opposite surfaces, as shown in FIG. 5.

Figure 6:
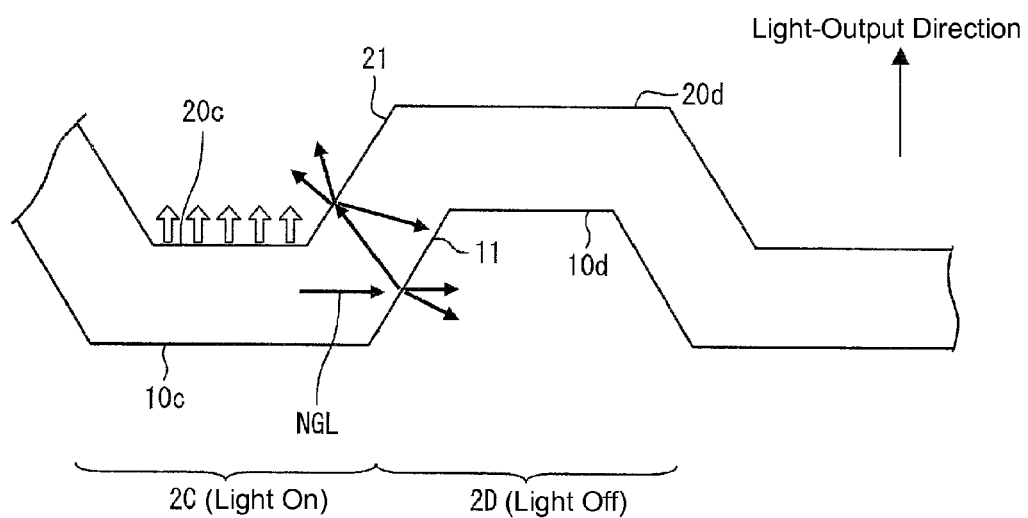
FIG. 6 is a partial magnified view of the configuration shown in FIG. 5.

The effects attained by the condition "i" will be described below with reference to FIG. 6. FIG. 6 is a magnified view of the light guide section 2C (second light guide section) and the light guide section 2D (first light guide section) shown in FIG. 5.

In FIG. 6, the light source 3C (FIGS. 1 and 2) for the light guide section 2C is on, while the light source 3D (FIGS. 1 and 2) for the light guide section 2D is off. Light from the light source 3C that enters the light guide section 2C is transmitted between the light-output surface 20c and the opposite surface 10c in a direction moving away from the light source 3C. The transmitted light is scattered by a reflective sheet to be mentioned later formed on the opposite surface 10c of the light guide section 2C, which means that the light no longer satisfies the total reflection condition, and the light is eventually outputted to the outside from the light-output surface 20c of the light guide section 2C. In the process of transmission, a portion of the light is transmitted towards the adjacent light guide section 2D in the process of transmission due to properties of light. The light guide section 2D and the light guide section 2C are structurally integral, and thus, the unwanted light NGL that is transmitted towards the light guide section 2D would reach the light guide section 2D and be outputted from the light-output surface 20d if the light guide plate did not satisfy the condition "i." However, in the present embodiment, the light guide plate does satisfy the condition "i," and thus, as shown in FIG. 6, the unwanted light NGL hits the first connective surface 21 and the second connective surface 11, which are inclined surfaces, and is repeatedly reflected and transmitted. The light gradually becomes weaker as it is repeatedly reflected and transmitted, and as a result, the unwanted light NGL disappears without reaching the light guide section 2D.

The effect described here also occurs between the light guide section 2A (second light guide section) and the light guide section 2B (first light guide section), between the light guide section 2B (first light guide section) and the light guide section 2C (second light guide section), and between the light guide section 2D (first light guide section) and the light guide section 2E (second light guide section), all of which satisfy the condition "i" and have the first connective surfaces 21 and the second connective surfaces 11.

Thus, it is possible to accurately control the light-outputting state and the non-light-outputting state for the respective light guide sections.

Also, the light is repeatedly transmitted through and reflected at a plurality of connective surfaces, and thus, a situation in which only one surface is illuminated by reflection does not occur, which prevents bright lines such as those of a conventional configuration from occurring.

An angle of incline θ of the first connective surface 21 and the second connective surface 11 with respect to the light-output direction exceeds 0° and is less than or equal to 65° (in other words, a maximum of 65°).

An angle of incline θ exceeding the upper limit (65°) is not desirable because the inclined portion would become large enough in relation to the pixel size for residual images to increase.

In other words, by satisfying the angle condition described above, the angle between the horizontal light-output surface and the inclined surface (the angle thereof less than 180°) is an obtuse angle. If this angle is 90° or an acute angle, light concentrates at this angular portion, resulting in a bright line being readily perceived. By satisfying the angle condition described above and forming an obtuse angle, the light is prevented from concentrating in the angular portion. As a result, it becomes difficult to perceive bright lines.

The light guide plate 2 can be formed of a material used in a conventionally known light guide body or light guide plate.

In the light guide plate 2, the boundary portions between the respective light-output surfaces 20a to 20e and the respective first connective surfaces 21, and the boundary portions between the opposite surfaces 10a to 10e and the respective second connective surfaces 11 may be rounded. As a result, inflection points at the boundary portions are eliminated, resulting in less light being concentrated therein, and allowing the perception of bright lines to be reduced.

Figure 7:
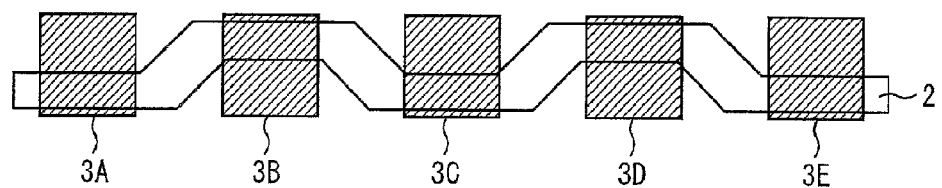
FIG. 7 is a side view of the planar illumination device shown in FIG. 1.

FIG. 7 shows an example of light sources 3A to 3E provided in the configuration of FIG. 5. As shown in FIG. 7, the five light sources 3A to 3E can be disposed at equal heights to each other along the alignment direction of the light guide sections 2A to 2E. By disposing the five light sources 3A to 3E at the same height, it is possible to mount them on one LED substrate.

Figure 8:
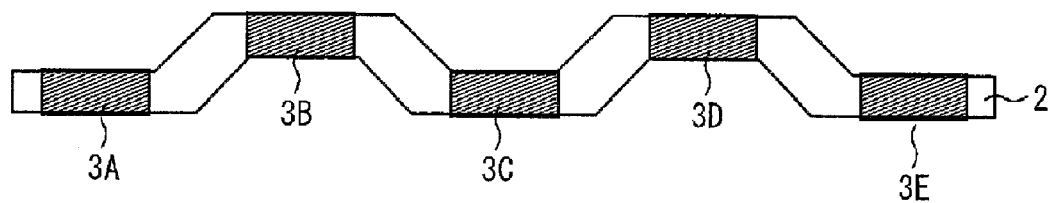
FIG. 8 is a side view of a different example of the planar illumination device shown in FIG. 1.

FIG. 8 shows a different arrangement pattern from FIG. 7. In the pattern shown in FIG. 8, the respective light sources 3A to 3E are disposed at varying heights to match in height with the light guide sections 2A to 2E.

In the description above, one light source was provided for one light guide section, but the present invention is not limited thereto; a configuration may be used in which a plurality of light sources are provided for one light guide section.

Characteristic configurations of a planar illumination device of the present embodiment have been described above.

Figure 9:
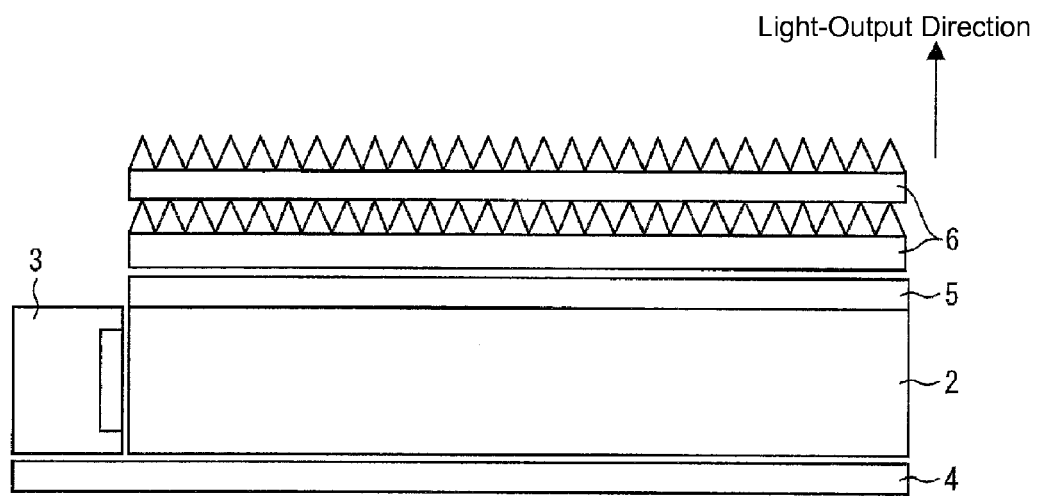
FIG. 9 is a cross-sectional view of a schematic configuration of one embodiment of a planar illumination device according to the present invention.

As another configuration, as shown in FIG. 9, the planar illumination device 1 includes a reflective sheet 4, a diffusion sheet 5, and lens sheets 6. FIG. 9 is a cross-sectional view of a planar illumination device of the present embodiment, the cross-section being taken of the planar illumination device along a direction moving away from the group of light sources 3.

The reflective sheet 4 is disposed on a side of the light guide plate 2 opposite to the light-output side, or in other words, the opposite surfaces 10a to 10e of the respective light guide sections 2A to 2E. Of the light entering the light guide plate 2 from the group of light sources 3, the light that has been transmitted to the outside from the opposite surfaces 10a to 10e and the second connective surfaces 11 is radiated onto the reflective sheet 4, and by reflecting off of the reflective sheet 4, the light re-enters the light guide plate 2.

By having the reflective sheet 4 be spread not only under the light guide plate 2 but also under the group of light sources 3, of the light outputted radially from the group of light sources 3, light that does not directly enter the edge face of the light guide plate 2 is reflected, and can therefore enter the light guide plate 2 from the edge face. A conventionally known reflective sheet can be used for the reflective sheet 4.

The diffusion sheet 5 is a sheet having light-diffusing properties and disposed on the light-output side of the light guide plate 2, or in other words, the light-output surfaces 20a to 20e. A conventionally known diffusion sheet can be used for the diffusion sheet 5, and can allow light to be evenly outputted from the light-output surface due to the fact that light outputted from at least one of the light-output surfaces 20a to 20e is diffused when it enters the diffusion sheet 5.

Figure 10:
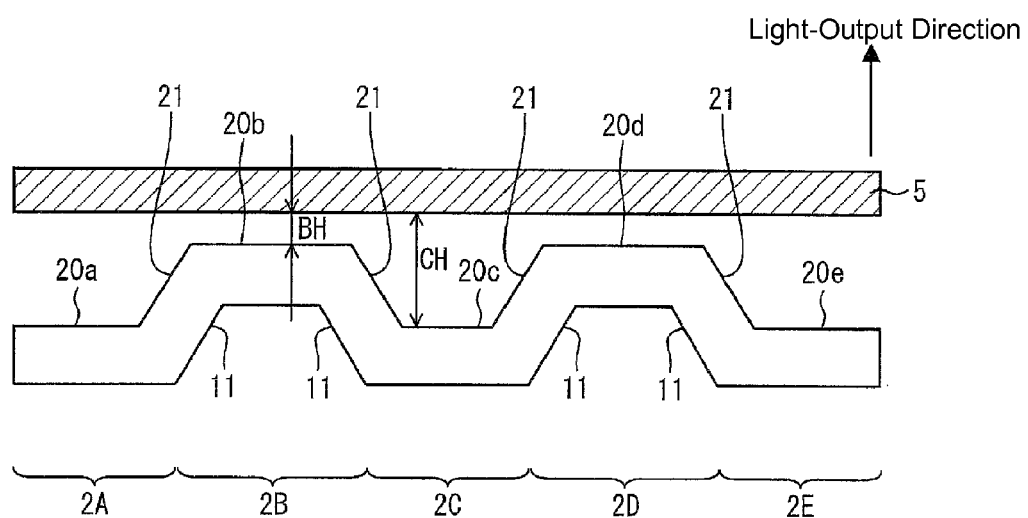
FIG. 10 is a cross-sectional view of a schematic configuration of a planar illumination device according to the present invention.

FIG. 10 is a cross-sectional view corresponding to FIG. 5 with the additional provision of the diffusion sheet 5. As stated above, the light guide plate 2 has steps, and thus, as shown in FIG. 10, a distance CH between the light-output surface 20c in the lower position and the diffusion sheet 5 is longer than a distance BH between the light-output surface 20b in the higher position and the diffusion sheet 5. The longer the distance between the light-output surface and the diffusion sheet is, the greater the amount of diffusion of outputted light is, and thus, the light outputted from the light-output surface 20c can be more evenly distributed across the light-output surface. In order to compensate for the difference in intensity of the light outputted from the light-output surfaces due to the difference in height therebetween, the intensity of the light emitted from the light sources can be differentiated, with the light source 3C for the lower position light-output surface 20c emitting light at a higher intensity than the light sources for the higher position light-output surfaces, thus equalizing the light intensity from the light-output surfaces.

One or a plurality of the lens sheets 6 are provided on the surface of the diffusion sheet 5 opposite to the light guide plate 2. The lens sheets can apply a desired index of refraction to light outputted from the diffusion sheet.

Before describing the liquid crystal display device of the present embodiment, a different example (1) of a step configuration of the light guide plate 2 will be described with reference to FIG. 11, and a different example (2) of the first connective surfaces and the second connective surfaces of the light guide plate 2 will be described with reference to FIG. 12.

Figure 11:
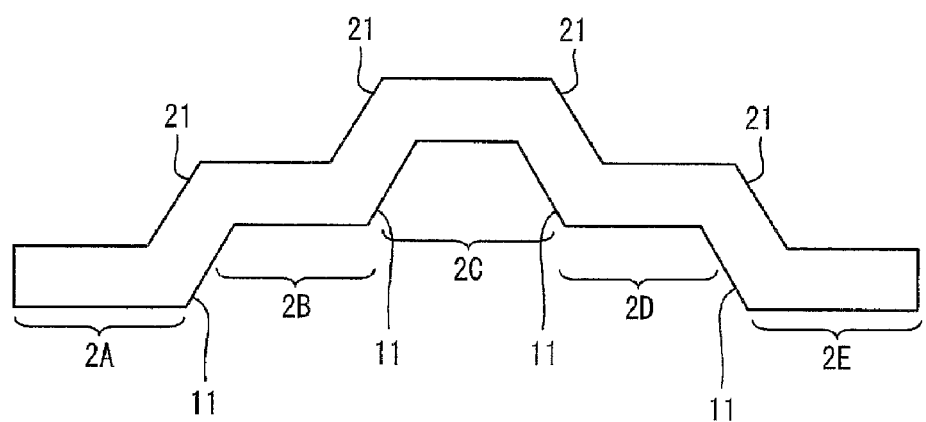
FIG. 11 is a cross-sectional view that shows a different example of a light guide plate provided in the planar illumination device shown in FIG. 1.

Different Example (1) of Light Guide Plate/Different Example of Step Configuration FIG. 11 is a cross-sectional view of a different example of a step structure of the light guide plate.

In the embodiment above, the light guide section 2A, the light guide section 2B, the light guide section 2C, the light guide section 2D, and the light guide section 2E are provided in this order such that the heights thereof in the light-output direction are low, high, low, high, and low. By contrast, in the different example, while satisfying condition "i," the light guide section 2A, the light guide section 2B, the light guide section 2C, the light guide section 2D, and the light guide section 2E have respective heights in the light-output direction in this order of low, mid, high, mid, and low, thus being at three levels. In other words, there are two step changes.

Specifically, as shown in FIG. 11, the height relation in the light-output direction between the light-output surface 20a of the light guide section 2A and the light-output surface 20b of the light guide section 2B satisfies the following inequality: height of light-output surface 20b (high)>height of light-output surface 20a (low). The height relation in the light-output direction between the light-output surface 20b of the light guide section 2B and the light-output surface 20c of the light guide section 2C satisfies the following inequality: height of light-output surface 20c (high)>height of light-output surface 20b (low). The height relation in the light-output direction between the light-output surface 20c of the light guide section 2C and the light-output surface 20d of the light guide section 2D satisfies the following inequality: height of light-output surface 20c (high)>height of light-output surface 20d (low). The height relation in the light-output direction between the light-output surface 20d of the light guide section 2D and the light-output surface 20e of the light guide section 2E satisfies the following inequality: height of light-output surface 20d (high)>height of light-output surface 20e (low). Based on the above relations, the light-output surfaces 20a to 20e can be formed into a plurality of steps, satisfying a height relation in the light-output direction of the following: height of light-output surface 20a<height of light-output surface 20b<height of light-output surface 20c>height of light-output surface 20d>height of light-output surface 20e. At this time, in the present embodiment, the light-output surface 20b and the light-output surface 20d have the same height, and the light-output surface 20a and the light-output surface 20e have the same height, and thus, there are three steps, which include the following: a first step (light-output surface 20a), a second step (light-output surface 20b), a third step (light-output surface 20c), the second step (light-output surface 20d), and the first step (light-output surface 20e).

The different example also satisfies the condition "i" and inclined surfaces similar to those of FIG. 5 are provided between respective light guide sections, and thus, the same effects as the configuration of FIG. 5 can be attained.

Figure 12:
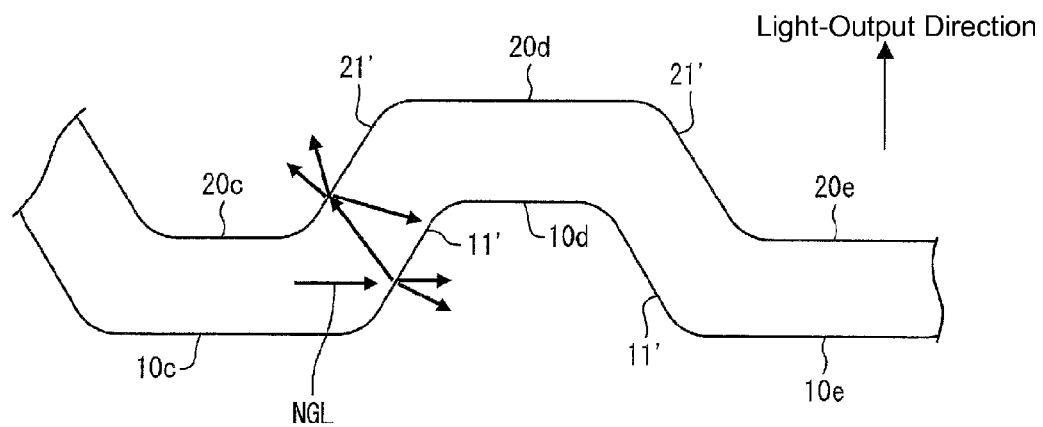
FIG. 12 is a partial magnified cross-sectional view that shows a different example of a light guide plate provided in the planar illumination device shown in FIG. 1.

Different Example (2) of Light Guide Plate/Different Example of First Connective Surfaces and Second Connective Surfaces FIG. 12 is a cross-sectional view of a different example of the first connective surfaces and the second connective surfaces of the light guide plate, and is a partial magnified cross-sectional view of a light guide plate corresponding to FIG. 6.

The first connective surfaces 21 and the second connective surfaces 11 of the light guide plate 2 shown in FIG. 6 are flat inclined surfaces, whereas first inclined surfaces 21' and second inclined surfaces 11' of a light guide plate 2 shown in FIG. 12 are curved.

By connecting the respective light-output surfaces to each other and the respective opposite surfaces to each other while satisfying the condition "i" using the curved first connective surfaces 21' and the second connective surfaces 11', as shown in FIG. 12, unwanted light NGL is radiated onto the first connective surfaces 21' and the second connective surfaces 11' and is reflected and transmitted repeatedly, similar to the situation in FIG. 6. The light gradually becomes weaker as it is repeatedly reflected and transmitted, and as a result, the unwanted light NGL disappears without reaching the light guide section 2D.

Thus, the first connective surfaces and the second connective surfaces do not need to be flat inclined surfaces, and as long as they do not block light outputted from each light-output surface and as long as unwanted light is repeatedly reflected and transmitted, there is no special limitation on the shape thereof.

<Liquid Crystal Display Device (Electronic Device)>

As the last section of the present embodiment, the liquid crystal display device of the present embodiment will be described.

Figure 13:
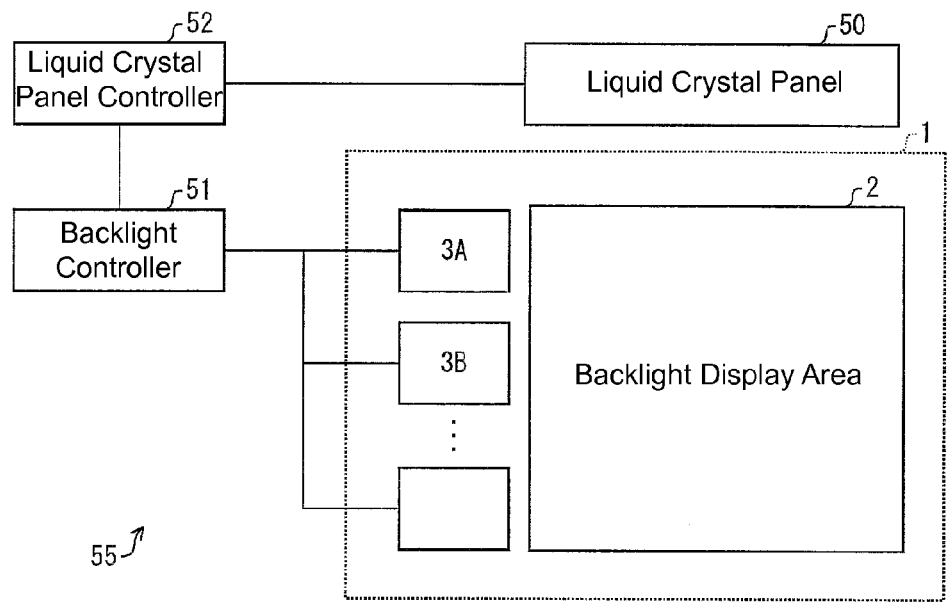
FIG. 13 shows a schematic configuration of a liquid crystal display device that is an electronic device provided with a planar illumination device, according to the present invention.

A liquid crystal display device 55 of the present embodiment is shown in FIG. 13. FIG. 13 shows a schematic configuration of a liquid crystal display device, which is an electronic device that includes the planar illumination device 1 of the present embodiment.

As shown in FIG. 13, the liquid crystal display device 55 of the present embodiment includes a planar illumination device 1, which is a backlight, a liquid crystal panel 50, a backlight controller 51, and a liquid crystal panel controller 52.

The liquid crystal panel 50 can be a conventionally known transmissive-type liquid crystal panel. The light emitted from the group of light sources 3 of the planar illumination device 1 is radiated onto the liquid crystal panel 50, from the light-output surfaces 20a to 20e of the light guide plate 2, and through the diffusion sheet 5 and the lens sheets 6.

The backlight controller 51 turns the light sources 3A to 3E of the group of light sources 3 on or off. A conventionally known backlight controller can be used for the backlight controller 51.

Also, a conventionally known liquid crystal panel controller can be used for the liquid crystal panel controller 52, which controls the light transmittance through the liquid crystal layer (not shown in drawings) of the liquid crystal panel 50.

The backlight controller 51 and the liquid crystal panel controller 52 are configured to work in synchronization with each other.

In a liquid crystal display device having a backlight of the present embodiment, the planar illumination device 1 is divided, and by sequentially turning off the divided portions in synchronization with a timing in which an image signal is applied to the liquid crystal panel, it is possible to attain backlight blinking, which is a technique in which a black image is inserted between adjacent instances of image display. As a result, pseudo-impulse display is attained, mitigating residual images.

<Operating Effects of the Present Embodiment>

In the planar illumination device 1 of the present embodiment, the opposite surface of a certain light guide section is higher in the light-output direction from the light-output surface than the light-output surface of another light guide section adjacent to the certain light guide section, with adjacent light-output surfaces being connected with the first connective surface 21 and adjacent opposite surfaces being connected with the second connective surface 11. With a difference in height for adjacent light guide sections, using the connective surfaces formed between the light guide sections, unwanted light, or in other words, light that is supposed to be guided to one light guide section but leaks towards an adjacent light guide section is repeatedly transmitted through and reflected at the connective surfaces. By repeatedly being transmitted through and being reflected at the connective surfaces, the unwanted light disappears before it reaches the adjacent light guide section, and thus, it is possible to prevent the unwanted light from entering the adjacent light guide section.

Also, by making the angle between the horizontal light-output surface and the inclined surface, and between the horizontal opposite surface and the inclined surface respectively (the angle less than 180°) obtuse angles, it is possible to prevent light from being concentrated at the angular portions, preventing a bright line from being perceived.

By using the configuration above, it is possible to provide a planar illumination device having a light guide plate for which area control can be performed without the appearance of bright lines.

Also, unlike a case in which a plurality of separated blocks are fixed together with a fixing jig or the like to form one light guide body, for example, a light guide plate is provided in the present invention, and thus, there is no need to fix the light guide sections to each other. If individually separate light guide sections are aligned in a row and fixed together, there is a need to have a uniform edge face position for all of the light guide sections, and if the light guide sections move out of alignment, the distance between the respective light sources and the edge faces becomes different for each light guide section, which means that the amount of light entering the individual light guide sections becomes varied. However, by providing a light guide plate such as that of the present invention, there is no need to conduct a step to make the positions of the edge faces of the light guide sections uniform, and because the distances between the respective light sources and the respective edge faces are equal, the amount of light entering therein can also be made equal.

Embodiment 2

The present embodiment described below has the same configuration as Embodiment 1 except in having a different condition "ii" from Embodiment 1. Thus, for ease of description, members having the same functions as those used in Embodiment 1 are assigned the same reference characters with descriptions thereof being omitted.

Figure 14:
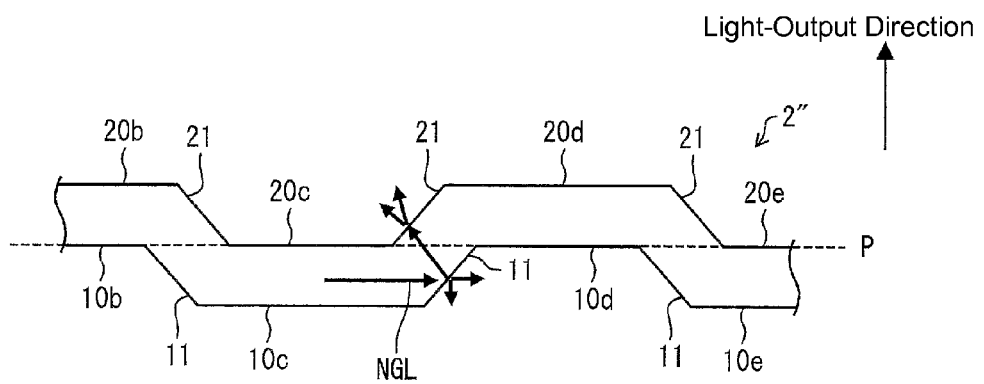
FIG. 14 is a partial magnified cross-sectional view that shows a light guide plate provided in a different embodiment of a planar illumination device according to the present invention.

FIG. 14 is a partial magnified cross-sectional view of a light guide plate disposed in a planar illumination device of the present embodiment, and corresponds to FIG. 6.

A light guide plate 2" disposed in the planar illumination device of the present embodiment has light guide sections equal in thickness to each other, and has a characteristic configuration in which two adjacent light guide sections satisfy the following condition "ii," and in which first connective surfaces 21 connecting adjacent light-output surfaces 20a to 20e and second connective surfaces 11 connecting adjacent opposite surfaces 10a to 10e are provided. Below, a light guide section 2C and a light guide section 2D are described as an example of two adjacent light guide sections out of the five light guide sections.

Condition "ii" is that:
<Condition "ii">
of the adjacent light guide sections, an opposite surface 10d of one light guide section 2D (first light guide section) is at the same position P in the light-output direction as a light-output surface 20c of the other light guide section 2C (second light guide section).

In the light guide plate 2", adjacent light guide sections 2A (second light guide section) and 2B (first light guide section) satisfy the condition "ii," adjacent light guide sections 2B (first light guide section) and 2C (second light guide section) satisfy the condition "ii," adjacent light guide sections 2C (second light guide section) and 2D (first light guide section) satisfy the condition "ii," and adjacent light guide sections 2D (first light guide section) and 2E (second light guide section) satisfy the condition "ii."

In the present embodiment also, similar to Embodiment 1 shown in FIG. 5, the light guide section 2A, the light guide section 2B, the light guide section 2C, the light guide section 2D, and the light guide section 2E are provided as steps in this order such that the heights thereof in the light-output direction are low, high, low, high, and low. The light-output surface 20a of the light guide section 2A, the light-output surface 20c of the light guide section 2C, and the light-output surface 20e of the light guide section 2E are at the same height (lower position) in the light-output direction, and the light-output surface 20b of the light guide section 2B and the light-output surface 20d of the light guide section 2D are at the same height (higher position). In other words, in the light guide plate 2" of the present embodiment also, it can be said that the surface thereof is at two different levels, as in FIG. 5 of Embodiment 1.

Even when satisfying the condition "ii," it is possible to attain similar effects as those of Embodiment 1, it is possible to accurately control the light-outputting state and the non-light-outputting state for each light guide section, and, by having the angle between the horizontal light-output surface and the inclined surface and the horizontal opposite surface and the inclined surface respectively form obtuse angles (for the respective angles less than 180°), it is possible to provide a planar illumination device that can prevent light from being concentrated at the angular portions, thus preventing bright lines from appearing therein.

Embodiment 3

The present embodiment described below has the same configuration as Embodiment 1 except in having a different condition "iii" from Embodiment 1. Thus, for ease of description, members having the same functions as those used in Embodiment 1 are assigned the same reference characters with descriptions thereof being omitted.

Figure 15:
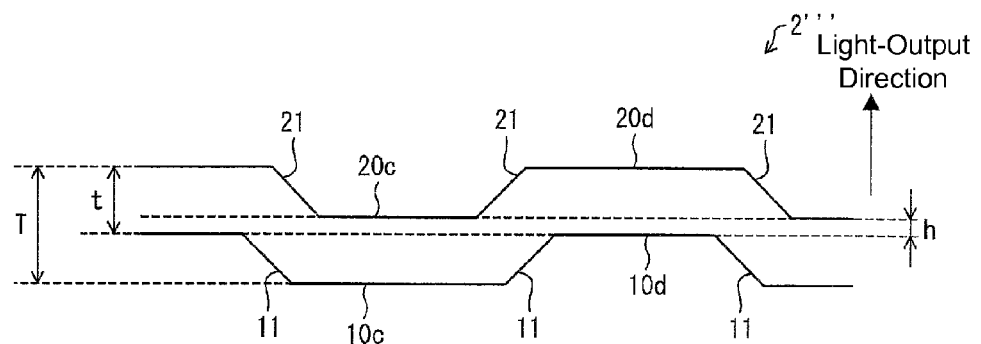
FIG. 15 is a partial magnified cross-sectional view that shows a light guide plate provided in a different embodiment of a planar illumination device according to the present invention.
Figure 16:
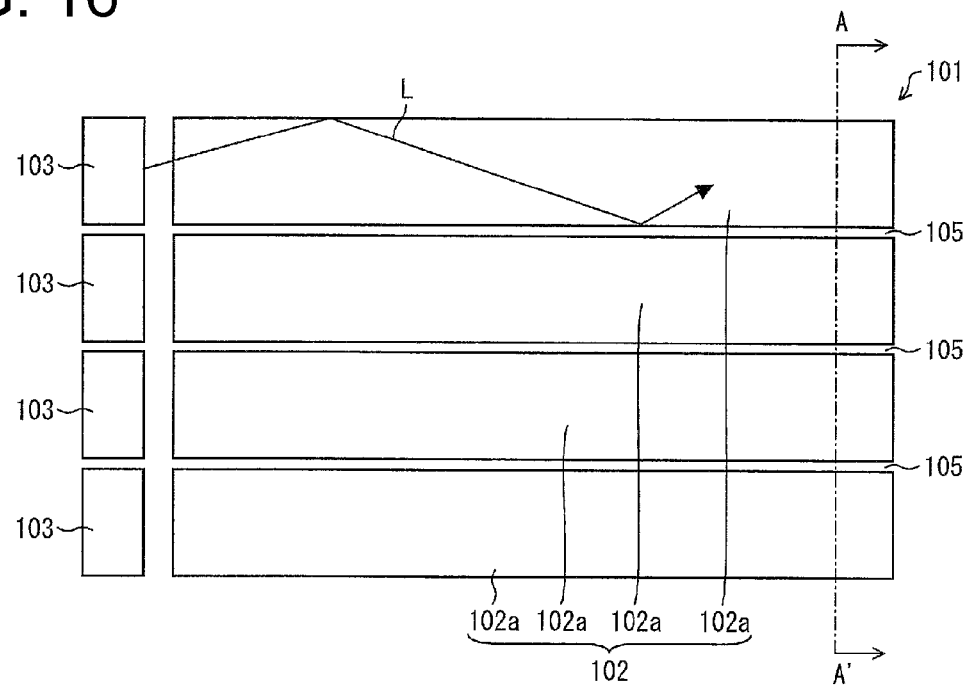
FIG. 16 is a diagram showing a conventional technology.
Figure 17:
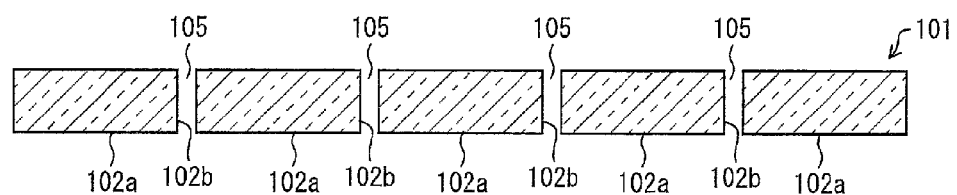
FIG. 17 is a diagram showing a conventional technology.
Figure 18:
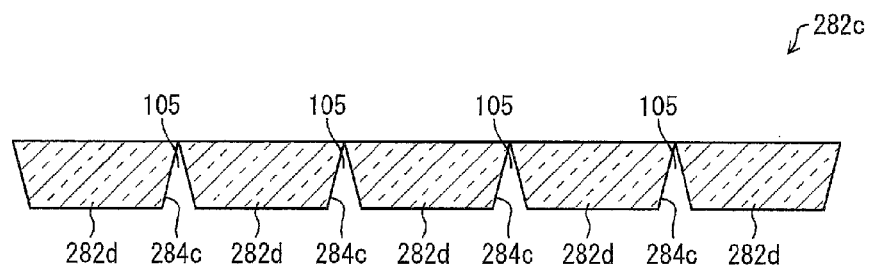
FIG. 18 is a diagram showing a conventional technology.

FIG. 15 is a partial magnified cross-sectional view of a light guide plate disposed in a planar illumination device of the present embodiment, and corresponds to FIG. 6.

In the light guide plate 2'" disposed in the planar illumination device of the present embodiment, the light guide sections all have the same thickness, and as a characteristic configuration, two adjacent light guide sections satisfy the following condition "iii," and the light guide plate 2'" also has first connective surfaces 21 that connect adjacent light-output surfaces 20a to 20e, and second connective surfaces 11 that connect adjacent opposite surfaces 10a to 10e. Below, a light guide section 2C and a light guide section 2D are described as an example of two adjacent light guide sections out of the five light guide sections.

Condition "iii" is that:
<Condition "iii">
of adjacent light guide sections, an opposite surface 10d of one light guide section 2D (first light guide section) is at a higher position in the light-output direction from the light-output surface than an opposite surface 10c of the other light guide section 2C (second light guide section), a light-output surface 20d of the light guide section 2D is higher in the light-output direction than a light-output surface 20c of the light guide section 2C, and the opposite surface 10d of the light guide section 2D (first light guide section) is at a lower position in the light-output direction than the light-output surface 20c of the light guide section 2C (second light guide section), with the difference in height ("h" in FIG. 15) in the light-output direction between the opposite surface 10d of the light guide section 2D and the light-output surface 20c of the light guide section 2C being a maximum of 35% of the difference in height ("t" in FIG. 15) between the light-output surface and the opposite surface of one light guide section.

In the light guide plate 2''', adjacent light guide sections 2A (second light guide section) and 2B (first light guide section) satisfy the condition "iii," adjacent light guide sections 2B (first light guide section) and 2C (second light guide section) satisfy the condition "iii," adjacent light guide sections 2C (second light guide section) and 2D (first light guide section) satisfy the condition "iii," and adjacent light guide sections 2D (first light guide section) and 2E (second light guide section) satisfy the condition "iii."

In the present embodiment also, similar to FIG. 5 of Embodiment 1, the light guide section 2A, the light guide section 2B, the light guide section 2C, the light guide section 2D, and the light guide section 2E are provided as steps in this order such that the heights thereof in the light-output direction are low, high, low, high, and low. The light-output surface 20a of the light guide section 2A, the light-output surface 20c of the light guide section 2C, and the light-output surface 20e of the light guide section 2E are at the same height (lower position) in the light-output direction, and the light-output surface 20b of the light guide section 2B and the light-output surface 20d of the light guide section 2D are at the same height (higher position). In other words, in the light guide plate 2''' of the present embodiment also, it can be said that the surface thereof is at two different levels, as in FIG. 5 of Embodiment 1.

As an example of the present embodiment, if the thickness of the light guide section ("t" in FIG. 15) is 0.3 mm, then the difference "h" is 35% or less of the thickness ("t" in FIG. 15) of the light guide section, which means that the difference "h" can be set to 0.1 mm or less. If the difference "h" exceeds 35% of the thickness of the light guide section ("t" in FIG. 15), then light would leak to the adjacent light guide sections, and thus, the difference "h" is set to 35% or less of the thickness of the light guide section ("t" in FIG. 15).

As another specific example, if the thickness of the light guide section ("t" in FIG. 15) is 0.3 mm, then the maximum thickness of the light guide plate 2 ("T" in FIG. 15) can be set to 0.5 mm.

Even when satisfying the condition "iii," it is possible to attain similar effects as those of Embodiment 1, it is possible to control the light-outputting state and the non-light-outputting state for each light guide section, and, by having the angle between the horizontal light-output surface and the inclined surface and the horizontal opposite surface and the inclined surface respectively form obtuse angles (for the respective angles less than 180°), it is possible to provide a planar illumination device that can prevent light from being concentrated at the angular portions, thus preventing bright lines from appearing therein.

The present invention is not limited to the embodiments above. Various modifications can be made to the present invention by those skilled in the art without departing from the scope specified by claims. That is, new embodiments can be obtained by combining technologies that were appropriately modified in the scope specified by claims. In other words, the specific embodiments provided in the detailed description of the present invention section are merely for illustration of the technical contents of the present invention. The present invention shall not be narrowly interpreted by being limited to such specific examples. Various changes can be made within the spirit of the present invention and the scope as defined by the appended claims.

SUMMARY OF INVENTION

As described above, the planar illumination device of the present invention includes:
a light guide plate having a plurality of light guide sections each having a light-output surface provided in an active light-emitting region and an opposite surface opposite to the light-output surface, the respective light-output surfaces of the light guide sections all facing the same direction; and a group of light sources disposed along an edge face of the light guide plate such that one or a plurality of light sources are provided for each of the light guide sections,
the light guide plate satisfying one of the following:
(i) an opposite surface of a first light guide section of the light guide sections is at a height greater than a light-output surface of a second light guide section adjacent to the first light guide section, height being defined with respect to a direction where light is outputted from the light-output surface;
(ii) the opposite surface of the first light guide section and the light-output surface of the second light guide section adjacent thereto are at the same height as each other; or
(iii) the opposite surface of the first light guide section is in a position at a height greater than an opposite surface of the second light guide section adjacent to the first light guide section, a light-output surface of the first light guide section is in a position at a height greater than the light-output surface of the second light guide section, the opposite surface of the first light guide section is in a position lower than the light-output surface of the second light guide section, and a difference in height between the opposite surface of the first light guide section and the light-output surface of the second light guide section is at most 35% of a difference in height between the light-output surface and the opposite surface of each one of the light guide sections,
the light guide plate having a first connective surface connecting the adjacent light-output surfaces, and a second connective surface connecting the adjacent opposite surfaces,
an angle formed between the light-output surface and the first connective surface in the light guide plate, and an angle formed between the opposite surface and the second connective surface in the light guide plate being obtuse angles.

According to the configuration above, it is possible to provide a planar illumination device having a light guide plate for which area control can be performed without the appearance of bright lines.

The planar illumination device of the present invention has light sources for the respective light guide sections of the light guide plate, and light emitted from the light sources enters a certain light guide section, and is transmitted therein in a direction moving away from the light sources. As known conventionally, some of the transmitted light moves towards a different light guide section adjacent to the certain light guide section in the process of being transmitted, due to the properties of light, and thus, in a conventional light guide body (light guide plate), this light simply entered the adjacent light guide section as is, or caused bright lines to be perceived at side faces thereof due to reflection. As a countermeasure, the planar illumination device according to the present invention has the configuration above such that with a difference in height for adjacent light guide sections, using the connective surfaces formed between the light guide sections, unwanted light, or in other words, light that is supposed to be guided to one light guide section but leaks to an adjacent light guide section is repeatedly transmitted through and reflected at the connective surfaces. As a result, it is possible to prevent the unwanted light from entering the adjacent light guide section.

More specifically, two adjacent light guide sections are designated as a first light guide section and a second light guide section. The light-output surfaces of the first light guide section and the second light guide section face the same direction, and the respective opposite surfaces, which are the surfaces opposite to the light-output surfaces, also face the same direction (direction opposite to the light-output direction). Light from the light source for each light guide section is transmitted therein, and is outputted from the light-output surface. In other words, the light-output surface is formed almost perpendicularly to the light-output direction, and the opposite surface opposite to the light-output surface is also formed almost perpendicularly to the light-output direction. In other words, the light-output surface of a certain light guide section is at a higher position than the opposite surface in the light-output direction.

In the present invention, in the first light guide section and the second light guide section, the light-output surfaces and the opposite surfaces of the adjacent first light guide section and the second light guide section are at different heights in the light-output direction from the light-output surface, and satisfy any one of the conditions (i) to (iii).

First, as in (i), the opposite surface of the first light guide section is at a higher position in the light-output direction than the light-output surface of the second light guide section, or as in (ii), the opposite surface of the first light guide section and the light-output surface of the second light guide section are at the same height in the light-output direction.

In other words, the first light guide section and the second light guide section are formed into steps.

With such a configuration, light transmitted within the first light guide section, for example, does not directly enter the second light guide section, and the light instead enters the area between the connective surfaces disposed at the step section at the boundary between the first light guide section and the second light guide section, and the light is repeatedly transmitted through and reflected at the connective surfaces.

In the conditions (i) or (ii), the first connective surface connecting the light-output surfaces and the second connective surface connecting the opposite surfaces are disposed opposite to each other, and thus, the light reflected at the first connective surface (unwanted light) is incident on the second connective surface, and then is transmitted therethrough or reflected thereat.

In this manner, the light is repeatedly transmitted through and reflected at two opposite connective surfaces, and thus, the unwanted light disappears before it reaches the adjacent light guide section, thereby allowing a configuration in which the light does not enter the adjacent light guide section.

Thus, a high degree of area control can be attained with the condition (i) or (ii).

Next, as in (iii) described above, the thickness from the light-output surface to the opposite surface is equal for all light guide sections, and the opposite surface of the first light guide section is at a lower position in the light-output direction from the light-output surface than the light-output surface of the second light guide section adjacent to the first light guide section; however, by satisfying the condition that the difference in height in the light-output direction between the opposite surface of the first light guide section and the light-output surface of the second light guide section is at most 35% of the difference in height between the light-output surface and the opposite surface of one light guide section, unwanted light can be transmitted through and reflected by two connective surfaces that face each other, and can be therefore weakened to a level in which the unwanted light is not outputted to the adjacent light guide section.

In the planar illumination device of the present invention, the angle between the light-output surface and the first connective surface in the light guide plate, and the angle between the opposite surface and the second connective surface in the light guide plate are obtuse angles, and thus, not as much light is concentrated at the angular parts compared to a case in which the angles are acute. Thus, bright lines do not appear, and a deterioration in display quality due to the bright lines that occurred in conventional devices does not occur.

By using the configuration above, it is possible to provide a planar illumination device having a light guide plate for which area control can be performed without the appearance of bright lines.

Also, unlike a case in which a plurality of separated blocks are fixed together with a fixing jig or the like to form one light guide body, for example, a light guide plate is provided in the present invention, and thus, there is no need to fix the light guide sections to each other. If individually separate light guide sections are aligned in a row and fixed together, there is a need to make the edge faces uniform in position for all of the light guide sections, and if the light guide sections move out of alignment, the distance between the respective light sources and the edge face becomes different for each light guide section, which means that the amount of light entering the individual light guide sections becomes varied. However, by providing a light guide plate such as that of the present invention, there is no need to conduct a step to make the positions of the edge faces of the light guide sections uniform, and because the distances between the respective light sources and the respective edge faces are equal, the amount of light entering therein can also be made equal.

In addition to the configuration above, in one example of the planar illumination device of the present invention, it is preferable that the first connective surface and the second connective surface be inclined surfaces inclined with respect to the light-output surfaces and the opposite surfaces.

More specifically, it is preferable that the inclined surfaces be at an angle exceeding 0° and less than or equal to 65° with respect to the direction where light is outputted.

According to this configuration, residual images in the animated image can be mitigated while mitigating the appearance of bright lines.

In addition to the configuration above, in one example of the planar illumination device of the present invention, it is preferable that a boundary between the light-output surface and the first connective surface be a curved surface.

According to this configuration, the boundary between the light-output surface and the first connective surface is curved, having undergone so-called rounding, and thus, an inflection point at the boundary (angular part) can be removed, the concentration of light in the angular part can be reduced, and the appearance of bright lines can be reduced.

In addition to the configuration above, in one example of the planar illumination device of the present invention, it is preferable that the first light guide section and the second light guide section be aligned alternately along the edge face of the light guide plate.

According to this configuration, along the edge face of the light guide plate, the light guide sections can be arranged alternately in the order of first light guide section, second light guide section, first light guide section, second light guide section, first light guide section, second light guide section, and first light guide section. In other words, the steps formed by the adjacent light guide sections change by one step level along the edge face of the light guide body such that the light guide sections are respectively high, low, high, low, high, low, and high.

As a result, unwanted light can be weakened and excellent area control can be conducted, and the light guide plate can be made relatively thin, and thus, this configuration is particularly advantageous in electronic devices such as mobile devices in which thinness is desired.

In addition to the configuration above, in one example of the planar illumination device of the present invention, it is preferable that the light guide sections be disposed along the edge face of the light guide body such that the light-output surfaces thereof are disposed at any one of three levels of differing heights in the direction where light is outputted.

In addition to the configuration above, in one example of the planar illumination device of the present invention, it is preferable that the light guide sections be disposed along the edge face of the light guide plate such that the light-output surfaces thereof are disposed at any one of three levels of differing heights.

The light-output surfaces being positioned on one of three levels with differing heights in the light-output direction means that the light-output surfaces aligned along the edge face of the light guide body are formed at three levels. Three levels being formed by the light-output surfaces aligned along the edge face of the light guide plate means that if three light guide sections A to C are aligned in this order along the edge face of the light guide body, for example, the height relation of the light-output surface "a," the light-output surface "b," and the light-output surface "c," of the light guide section A, the light guide section B, and the light guide section C, respectively, satisfies the following: height of light-output surface "a" (high)>height of light-output surface "b" (mid)>height of light-output surface "c" (low). Specifically, if the light guide section A is the first light guide section and the light guide section B is the second light guide section, the height relation in the light-output direction between the light-output surface "a" of the light guide section A and the light-output surface "b" of the light guide section B satisfies the following: height of light-output surface "a" (high)>height of light-output surface "b" (low). As for the relation between the light guide section B and the light guide section C, if the light guide section B is the first light guide section and the light guide section C is the second light guide section, then similar to what was described above, the height relation in the light-output direction between the light-output surface "b" of the light guide section B and the light-output surface "c" of the light guide section C satisfies the following: height of light-output surface "b" (high)>height of light-output surface "c" (low). Therefore, the height relation between the light-output surfaces of the light guide section A, the light guide section B, and the light guide section C is as follows: height of light-output surface "a" (high)>height of light-output surface "b" (mid)>height of light-output surface "c" (low).

If five light guide sections A to E are aligned in this order along the edge face of the light guide plate, then the height relation between the light-output surface "a," the light-output surface "b," the light-output surface "c," the light-output surface "d," and the light-output surface "e" of the light guide section A, the light guide section B, the light guide section C, the light guide section D, and the light guide section E are such that the light-output surface "a" and the light-output surface "e" on both edges of the light guide plate are at the high position, the light-output surface "b" and the light-output surface "d" are at the mid position, and the light-output surface "c" is at the low position, thus constituting the three levels of the light guide plate, for example. Specifically, if the light guide sections A to C have the above-mentioned relation, and if the light guide section C in this case is the second light guide section and the light guide section D is the first light guide section, then the light-output surface "c" of the light guide section C and the light-output surface "d" of the light guide section D have a height relation in the light-output direction such that the height of the light-output surface "d" (high)>the height of the light-output surface "c" (low), and if the light guide section D is the second light guide section, and the light guide section E is the first light guide section here also, then the height relation in the light-output direction of the light-output surface "d" of the light guide section D and the light-output surface "e" of the light guide section E is the following: the height of the light-output surface "e" (high)>the height of the light-output surface "d" (low). In such a case, the height relation between the light-output surfaces of the five light guide sections A to E mentioned above is such that the height of the light-output surface "a">the height of the light-output surface "b">the height of the light-output surface "c"<the height of the light-output surface "d"<the height of the light-output surface "e," forming a plurality of levels. In this case, if the heights of the light-output surface "b" and the light-output surface "d" are the same and the heights of the light-output surface "a" and the light-output surface "e" are the same, then in the case of the light guide body above, it is possible to make a three level configuration constituted of the first level (light-output surface "a"), the second level (light-output surface "b"), the third level (light-output surface "c"), the second level (light-output surface "d"), and the first level (light-output surface "e").

With such a three level configuration or a configuration with more than three levels, it is possible to have a configuration that functions in a curved display.

In addition to the configuration above, in one example of the planar illumination device of the present invention, it is preferable that the light guide plate have an inactive light-emitting region between the edge face and the light-output surfaces, and that the inactive light-emitting region have a slit formed therein in a position corresponding to a boundary between the adjacent light-output surfaces.

According to this configuration, even if the inactive light-emitting region is formed between the edge face and the light-output surface of the light guide plate, the slits can optically divide the inactive light-emitting region, and thus, light from light sources that are adjacent along the edge face is not transmitted to light guide sections that do not face the light source, thus allowing excellent area control.

In addition to the configuration above, in one example of the planar illumination device of the present invention, it is preferable that the group of light sources include light sources disposed at the same height along the edge face.

According to this configuration, it is possible to form the light sources integrally, thus allowing position setting with ease.

In addition to the configuration above, in one example of the planar illumination device of the present invention, it is preferable that the group of light sources include light sources disposed at differing heights along the edge face depending on the position of the light-output surfaces of the light guide sections.

According to this configuration, the light sources can be disposed in positions closest to the corresponding light guide sections, allowing high light usage efficiency and preventing unwanted light.

In addition to the configuration above, in one example of the planar illumination device of the present invention, it is preferable that a reflective sheet be provided on the opposite surfaces of the light guide plate.

With this configuration, light that has leaked to outside the light guide member having been transmitted through the opposite surface can be reflected back into the opposite surface by the reflective sheet, thus allowing the light to re-enter the light guide member. Thus, the usage efficiency of light can be increased.

In addition to the configuration above, in one example of the planar illumination device of the present invention, it is preferable that a diffusion sheet be provided on the light-output surfaces of the light guide plate.

With this configuration, light outputted from the light-output surface can be diffused by the diffusion sheet, thus allowing light to be evenly outputted from the diffusion sheet.

In addition to the configuration above, in one example of the planar illumination device of the present invention, it is preferable that one or a plurality of lens sheets be provided on a surface of the diffusion sheet opposite to the light guide plate.

According to this configuration, it is possible to have a desired index of refraction for the light outputted from the diffusion sheet using the plurality of lens sheets.

The present invention also includes an electronic device that includes a planar illumination device having the above-mentioned configuration.

The present invention also includes a liquid crystal display device having: the planar illumination device having the above-mentioned configuration; and a liquid crystal display panel having a liquid crystal layer, the liquid crystal display panel being disposed opposite to the active light-emitting region of the light guide plate.

INDUSTRIAL APPLICABILITY

The planar illumination device according to the present invention can not only be used as a general illumination device, but can also be used in an electronic device such as a liquid crystal display device as a light source module such as a backlight.

DESCRIPTION OF REFERENCE CHARACTERS 1 planar illumination device
2, 2', 2", 2''' light guide plate
2A to 2E light guide section
3 group of light sources
3A to 3E light source
4 reflective sheet
5 diffusion sheet
6 lens sheet
10a to 10e opposite surface
11, 11' second connective surface
20a to 20e light-output surface
21, 21' first connective surface
23 slit
50 liquid crystal panel
51 backlight controller
52 liquid crystal panel controller
55 liquid crystal display device (electronic device)
NGL unwanted light

The invention claimed is:

1. A planar illumination device, comprising: a light guide plate having a plurality of light guide sections each having a light-output surface provided in an active light-emitting region and an opposite surface opposite to the light-output surface, the respective light-output surfaces of the light guide sections all facing the same direction; and a group of light sources disposed along an edge face of the light guide plate such that one or a plurality of light sources are provided for each of the light guide sections, wherein, in the light guide plate, one of the following is satisfied:

(i) an opposite surface of a first light guide section of the light guide sections is at a height greater than a light-output surface of a second light guide section adjacent to the first light guide section, height being defined with respect to a direction where light is outputted from the light-output surface;

(ii) the opposite surface of the first light guide section and the light-output surface of the second light guide section adjacent thereto are at the same height as each other; or (iii) the opposite surface of the first light guide section is in a position at a height greater than an opposite surface of the second light guide section adjacent to the first light guide section, a light-output surface of the first light guide section is in a position at a height greater than the light-output surface of the second light guide section, the opposite surface of the first light guide section is in a position lower than the light-output surface of the second light guide section, and a difference in height between the opposite surface of the first light guide section and the light-output surface of the second light guide section is at most 35% of a difference in height between the light-output surface and the opposite surface of each one of the light guide sections, wherein the light guide plate has a first connective surface connecting the adjacent light-output surfaces, and a second connective surface connecting the adjacent opposite surfaces, and wherein an angle formed between the light-output surface and the first connective surface in the light guide plate, and an angle formed between the opposite surface and the second connective surface in the light guide plate are obtuse angles.

2. The planar illumination device according to claim 1, wherein the first connective surface and the second connective surface are inclined surfaces inclined with respect to the light-output surfaces and the opposite surfaces.

3. The planar illumination device according to claim 2, wherein the inclined surfaces are at an angle exceeding 0° and less than or equal to 65° with respect to the direction where light is outputted.

4. The planar illumination device according to claim 1, wherein a boundary between the light-output surface and the first connective surface is a curved surface.

5. The planar illumination device according to claim 1, wherein the first light guide section and the second light guide section are aligned alternately along the edge face of the light guide plate.

6. The planar illumination device according to claim 1, wherein the light guide sections are disposed along the edge face of the light guide plate such that the light-output surfaces thereof are disposed at any one of three levels of differing heights in the direction where light is outputted.

7. The planar illumination device according to claim 1, wherein the light guide plate has an inactive light-emitting region between the edge face and the light-output surfaces, and
wherein the inactive light-emitting region has a slit formed therein in a position corresponding to a boundary between the adjacent light-output surfaces.

8. The planar illumination device according to claim 1, wherein the group of light sources includes light sources disposed at the same height along the edge face.

9. The planar illumination device according to claim 1, wherein the group of light sources includes light sources disposed at differing heights along the edge face depending on the position of the light-output surfaces of the light guide sections.

10. The planar illumination device according to claim 1, wherein a reflective sheet is provided on the opposite surfaces of the light guide plate.

11. The planar illumination device according to claim 1, wherein a diffusion sheet is provided on the light-output surfaces of the light guide plate.

12. The planar illumination device according to claim 11, wherein one or a plurality of lens sheets are provided on a surface of the diffusion sheet opposite to the light guide plate.

13. An electronic device, comprising the planar illumination device according to claim 1.

14. A liquid crystal display device, comprising: the planar illumination device according to claim 1; and a liquid crystal display panel having a liquid crystal layer, wherein the liquid crystal display panel is disposed opposite to the active light-emitting region of the light guide plate.

* * * * *